(12) United States Patent
Lee et al.

(10) Patent No.: US 11,949,078 B2
(45) Date of Patent: Apr. 2, 2024

(54) HEAT MANAGEMENT SYSTEM

(71) Applicant: Hanon Systems, Daejeon (KR)

(72) Inventors: Hae-Jun Lee, Daejeon (KR); Moo Joong Kim, Daejeon (KR); In-Guk Hwang, Daejeon (KR)

(73) Assignee: Hanon Systems, Daejeon (KR)

(*) Notice: Subject to any disclaimer, the term of this patent is extended or adjusted under 35 U.S.C. 154(b) by 365 days.

(21) Appl. No.: 17/282,454

(22) PCT Filed: Oct. 2, 2019

(86) PCT No.: PCT/KR2019/012940
§ 371 (c)(1),
(2) Date: Apr. 2, 2021

(87) PCT Pub. No.: WO2020/071801
PCT Pub. Date: Apr. 9, 2020

(65) Prior Publication Data
US 2021/0384572 A1  Dec. 9, 2021

(30) Foreign Application Priority Data
Oct. 4, 2018 (KR) .................. 10-2018-0118347

(51) Int. Cl.
*H01M 10/613* (2014.01)
*F25B 41/20* (2021.01)
(Continued)

(52) U.S. Cl.
CPC ........... *H01M 10/613* (2015.04); *F25B 41/20* (2021.01); *F25B 41/24* (2021.01); *H01M 10/625* (2015.04);
(Continued)

(58) Field of Classification Search
CPC ............ H01M 10/613; H01M 10/625; H01M 10/6556; H01M 10/6568; H01M 10/663;
(Continued)

(56) References Cited

U.S. PATENT DOCUMENTS 9,731,577 B2 * 8/2017 Johnston ............ B60H 1/00921
10,573,940 B2 * 2/2020 Dunham ............. H01M 10/617
(Continued)

FOREIGN PATENT DOCUMENTS

KR 10-2012-0137100 A 12/2012
KR 10-2014-0147365 A 12/2014
(Continued)

*Primary Examiner* — Len Tran
*Assistant Examiner* — Gustavo A Hincapie Serna
(74) *Attorney, Agent, or Firm* — Norton Rose Fulbright US LLP; James R. Crawford

(57) ABSTRACT

A heat management system including a refrigerant circulation line including a compressor, a water-cooling condenser, an air-cooling condenser, a first expansion valve, an evaporator, a refrigerant heat exchanger, and a gas/liquid separator that discharges only a liquid refrigerant, and cooling an indoor place by circulating a refrigerant; a heating line for heating the indoor place by circulating, through the water-cooling condenser, cooling water that exchanges heat with the refrigerant; and a cooling line for cooling a battery and an electrical component by circulating air or cooling water that exchanges heat with the refrigerant. Therefore, the present invention can not only cool and heat a vehicle but also efficiently manage heat for an electrical component and a battery in a vehicle, and can reduce the number of constituent components for heating and cooling.

20 Claims, 12 Drawing Sheets

(51) Int. Cl.
*F25B 41/24* (2021.01)
*H01M 10/625* (2014.01)
*H01M 10/6556* (2014.01)
*H01M 10/6568* (2014.01)
*H01M 10/663* (2014.01)

(52) U.S. Cl.
CPC ... *H01M 10/6556* (2015.04); *H01M 10/6568* (2015.04); *H01M 10/663* (2015.04); *H01M 2220/20* (2013.01)

(58) Field of Classification Search
CPC ..... H01M 2220/20; F25B 41/20; F25B 41/24; B60H 1/00392; B60H 2001/00928; B60H 2001/00949; B60H 1/00885; B60H 1/00921; B60H 1/143; B60H 1/32284; B60H 2001/00307
USPC .......................................................... 62/160
See application file for complete search history.

(56) References Cited

U.S. PATENT DOCUMENTS

| | | | | |
|---|---|---|---|---|
| 10,677,500 | B2* | 6/2020 | Kim | F25B 25/005 |
| 11,192,428 | B2* | 12/2021 | Miyakoshi | B60H 1/0073 |
| 11,506,404 | B2* | 11/2022 | Ito | F25B 1/00 |
| 2013/0206360 | A1* | 8/2013 | Zhang | B60H 1/00057 |
| | | | | 165/42 |
| 2014/0223943 | A1* | 8/2014 | Ichishi | B60H 1/3205 |
| | | | | 62/215 |
| 2014/0298838 | A1* | 10/2014 | Morishita | F25D 21/004 |
| | | | | 62/151 |
| 2015/0032318 | A1* | 1/2015 | Gao | B60H 1/00392 |
| | | | | 903/903 |
| 2015/0308719 | A1* | 10/2015 | Gebbie | B60H 1/00921 |
| | | | | 62/324.1 |
| 2016/0107508 | A1 | 4/2016 | Johnston | |
| 2017/0008407 | A1* | 1/2017 | Porras | B60L 58/24 |
| 2017/0021698 | A1 | 1/2017 | Hatakeyama et al. | |
| 2017/0240024 | A1* | 8/2017 | Blatchley | B60H 1/3213 |
| 2017/0350624 | A1* | 12/2017 | Kawakubo | F25B 41/22 |
| 2018/0117991 | A1* | 5/2018 | Kim | B60H 1/00899 |
| 2019/0047361 | A1* | 2/2019 | Lee | B60H 1/00885 |
| 2019/0118610 | A1* | 4/2019 | Johnston | B60H 1/32284 |
| 2019/0176572 | A1* | 6/2019 | Kim | B60H 1/00428 |
| 2019/0275858 | A1* | 9/2019 | Seki | B60H 1/00907 |
| 2019/0291540 | A1* | 9/2019 | Gutowski | B60H 1/00278 |
| 2019/0351740 | A1* | 11/2019 | Filipkowski | B60H 1/32284 |
| 2019/0381857 | A1* | 12/2019 | Lee | B60H 1/00278 |
| 2020/0009968 | A1* | 1/2020 | Lewis | H01M 10/6568 |
| 2020/0031194 | A1* | 1/2020 | Lee | B60H 1/00278 |
| 2020/0047583 | A1* | 2/2020 | Ishizeki | H01M 10/635 |
| 2020/0047586 | A1* | 2/2020 | Gonze | B60H 1/3227 |
| 2020/0101814 | A1* | 4/2020 | Takagi | B60H 1/00007 |
| 2020/0122544 | A1* | 4/2020 | Ishizeki | B60H 1/143 |
| 2020/0158380 | A1* | 5/2020 | Suzuki | F25B 25/005 |
| 2020/0180401 | A1* | 6/2020 | Aoki | B60H 1/00428 |
| 2020/0298665 | A1* | 9/2020 | Nakazawa | B60H 1/00921 |
| 2020/0346520 | A1* | 11/2020 | Ishizeki | B60H 1/00885 |
| 2021/0016629 | A1* | 1/2021 | Miyakoshi | B60H 1/32 |
| 2021/0309070 | A1* | 10/2021 | Ishizeki | B60H 1/32011 |
| 2021/0323379 | A1* | 10/2021 | Kaneko | B60H 1/32284 |

FOREIGN PATENT DOCUMENTS

| | | |
|---|---|---|
| KR | 20170067502 A | 6/2017 |
| KR | 10-2017-0108447 A | 9/2017 |
| KR | 10-2017-0112659 A | 10/2017 |
| KR | 101846923 B1 | 4/2018 |

* cited by examiner

HEAT MANAGEMENT SYSTEM

This application is a national phase under 35 U.S.C. § 371 of International Application No. PCT/KR2019/012940 filed Oct. 2, 2019, which claims the benefit of priority from Korean Patent Application No. 10-2018-0118347 filed on Oct. 4, 2018. The entire contents of these applications are incorporated herein by reference in their entirety.

TECHNICAL FIELD

The present invention relates to a heat management system, and in particular, to a system for managing heat of electric components and batteries in a vehicle as well as cooling and heating of the vehicle.

BACKGROUND ART

Recently, electric vehicles have been spotlighted as implementation of environmentally friendly technologies and solutions to problems such as energy depletion in an automotive field.

Electric vehicles are driven using a motor actuated upon receiving power from a battery or a fuel cell, so that carbon emission and noise are low. In addition, electric vehicles are eco-friendly as they use motors that are more energy efficient than existing engines.

However, since electric vehicles generate a lot of heat when a battery and a driving motor are operated, heat management is important. In addition, since it takes a long time to recharge the battery, it is important to efficiently manage a usage time of the battery. In particular, since a refrigerant compressor of electric vehicles driven for indoor air conditioning is also driven by electricity, it is more important to manage the usage time of the battery. In addition, since a drive motor and an inverter generate relatively more heat than other electric components such as batteries or chargers, they must be cooled to an appropriate temperature, and to this end, there is a need to increase cooling performance of a heat exchanger.

RELATED ART DOCUMENT

Patent Document

KR 2014-0147365 A (2014.12.30)

DISCLOSURE

Technical Problem

An object of the present invention is to provide a heat management system capable of efficiently managing heat of electric components and batteries in a vehicle as well as cooling and heating of the vehicle.

Another object of the present invention is to provide a heat management system capable of configuring a cooling system at a low cost by reducing the number of components for a cooling operation.

Technical Solution

In one general aspect, a heat management system includes: a refrigerant circulation line 200 including a compressor 210, a water-cooled condenser 220, a gas-liquid separator 235, an air-cooled condenser 230, a first expansion valve 240, an evaporator 242, and a refrigerant heat exchanger 233 for heat-exchanging a refrigerant flowing into the evaporator 242 and a refrigerant discharged from the evaporator 242 with each other, wherein the gas-liquid separator 235 is installed in and connected to a refrigerant flow path from the water-cooled condenser 220 to the air-cooled condenser 230, separates a gaseous refrigerant and a liquid refrigerant from an introduced refrigerant to discharge the liquid refrigerant, and circulates a refrigerant to cool an indoor area; a heating line 301 heating the indoor area by circulating a coolant heat-exchanged with the refrigerant through the water-cooled condenser 220; and a cooling line 302 cooling a battery 350 and an electric component 460 by circulating a coolant heat-exchanged with air or the refrigerant.

The cooling line 302 may include a first connection line 302-1 branched from one side of the cooling line 302 and connected to the heating line 301; and a second connection line 302-2 branched from the other side of the cooling line 302 and connected to the heating line 301.

The first connection line 302-1, the second connection line 302-2, and the heating line 301 may be connected to a first directional valve 410, and the cooling line 302 and the heating line 301 may be connected to each other or blocked in connection by the first directional valve 410.

The electric component 460 may be disposed on the second connection line 302-2.

The cooling line 302 may further include: a fourth connection line 302-4 connecting the first connection line 302-1 and the second connection line 302-2; and a shut-off valve 360 installed on the fourth connection line 302-4 and disposed in parallel with the first directional valve 410.

The cooling line 302 may further include a coolant temperature sensor 461 installed in front of the electric component 460 in a flow direction of coolant.

The refrigerant circulation line 200 may further include a second expansion valve 251 throttling or bypassing a refrigerant discharged from the water-cooled condenser 220 or blocking a flow of the refrigerant; and a chiller 252 heat-exchanging a refrigerant discharged from the second expansion valve 251 with coolant of the cooling line 302.

The cooling line 302 may include a third connection line 302-3 connected in parallel with the battery 350 and passing through the chiller 252, and the third connection line 302-3 may be connected to the cooling line 302 by the third directional valve 330 so that a coolant may flow in the third connection line 302-3 or a flow of the coolant may be blocked by the third directional valve 330.

The cooling line 302 may include an electric radiator 310 for cooling the coolant with air.

The heating line 301 may include a heater core 440 heating an indoor area using air heated by heat-exchanging a coolant heat-exchanged with a refrigerant through the water-cooled condenser 220 and air introduced to the indoor area; and a coolant heater 430 disposed in front of the heater core 440 in a flow direction of the coolant to heat the coolant.

The heat management system may further include: an air heating type heater 470 configured separately from the heating line 301 and heating an indoor area by directly heating air introduced to the indoor area.

The heating line 301 may include a heater core 440 heating the indoor area using heated air by heat-exchanging a coolant heat-exchanged with a refrigerant through the water-cooled condenser 220 and air introduced to the indoor area, and the heat management system may further include: the air heating type heater 470 configured separately from the heating line 301 and heating an indoor area by directly heating air introduced to the indoor area.

The cooling line 302 may further include a coolant heater 430 disposed close to the battery 350 to heat a coolant passing through the battery 350.

The gas-liquid separator 235 may be disposed close to the rear of the water-cooled condenser 220 in a flow direction of the refrigerant so as to be formed integrally, or the gas-liquid separator 235 may be disposed close to the front of the air-cooled condenser 230 so as to be formed integrally.

The gas-liquid separator 235 may be disposed inside the air-cooled condenser 230, and a partial area of the air-cooled condenser 230 demarcated by the gas-liquid separator 235 may be used as a condensed area A1 and the other area may be used as a sub-cooled area A2.

In a mild cooling mode, the second expansion valve 251 may be closed so that a refrigerant may not pass through the chiller 252.

In a maximum heating mode, a refrigerant may not be circulated in the refrigerant circulation line 200.

In the maximum heating mode, a coolant may not be circulated in the cooling line 302.

In the mild heating mode, a refrigerant may not be circulated in the refrigerant circulation line 200.

In a battery temperature rising mode, a refrigerant may not be circulated in the refrigerant circulation line 200.

Advantageous Effects

The heat management system of the present invention enables efficient heat management of electric components and batteries in a vehicle as well as cooling and heating of the vehicle, and has the advantage of configuring a low-cost cooling system by reducing the number of components for cooling.

BEST MODE

Hereinafter, a heat management system of the present invention having the configuration as described above will be described in detail with reference to the accompanying drawings.

Figure 1:
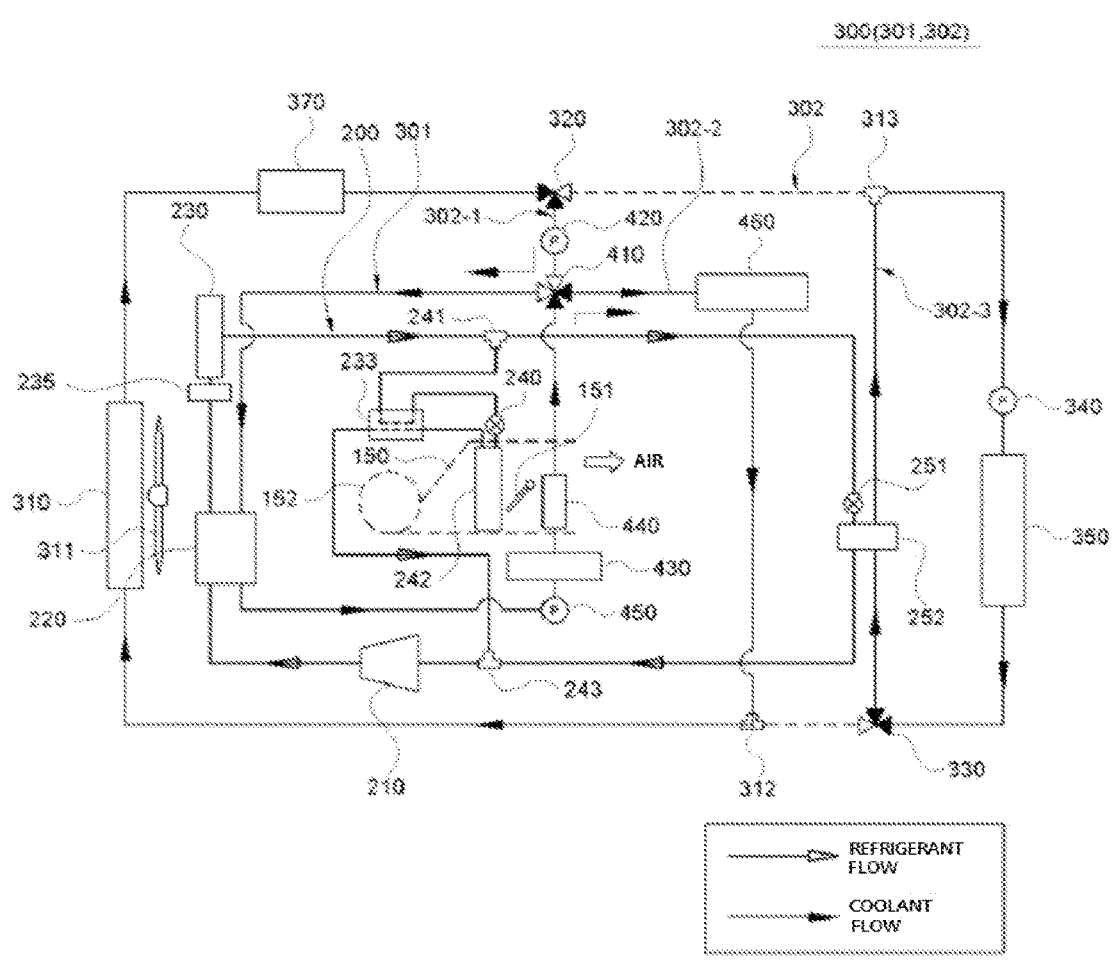
FIG. 1 is a block diagram showing a configuration of a heat management system according to an exemplary embodiment of the present invention and an operating state in a maximum cooling mode.

FIG. 1 is a configuration diagram showing a configuration of a heat management system according to an exemplary embodiment of the present invention and an operating state in a maximum cooling mode.

Referring to FIG. 1, a heat management system of the present invention may include a refrigerant circulation line 200 in which a refrigerant circulates to cool an indoor area and a coolant circulation line 300 in which a coolant circulates to heat the indoor area and cool components. In addition, the coolant circulation line 300 may include a heating line 301 for indoor heating and a cooling line 302 for cooling an electric component 460 and a battery 350.

The refrigerant circulation line 200 may include a compressor 210, a water-cooled condenser 220, a gas-liquid separator 235, an air-cooled condenser 230, a refrigerant branch part 241, a first expansion valve 240, an evaporator 242, a refrigerant heat exchanger 233, a refrigerant joining part 243, a second expansion valve 251, and a chiller 252.

The compressor 210 may be an electric compressor driven upon receiving power, and serves to suction and compress a refrigerant and discharge the refrigerant toward the water-cooled condenser 220.

The water-cooled condenser 220 serves to heat-exchange the refrigerant discharged from the compressor 210 with a coolant to condense it into a liquid refrigerant, and send the condensed refrigerant to the gas-liquid separator 235.

The gas-liquid separator 235 serves to discharge only a liquid refrigerant by separating the liquid refrigerant from a gaseous refrigerant in an introduced refrigerant, and may serve to temporarily store pressure of the refrigerant in the refrigerant line.

The air-cooled condenser 230 serves as a condenser and may serve to subcool only the liquid refrigerant discharged through the gas-liquid separator 235. In addition, the air-cooled condenser 230 may be air-cooled by external air.

The refrigerant branch part 241 may branch a refrigerant line into two refrigerant lines at the rear of the air-cooled condenser 230 so that one refrigerant line may be connected to the evaporator 242 and the other refrigerant line may be connected to the chiller 252.

The first expansion valve 240 and the second expansion valve 251 may serve to throttle or bypass the refrigerant or block a flow of the refrigerant. In addition, the first expansion valve 240 and the second expansion valve 251 may be configured in parallel. That is, two refrigerant lines may be branched from the refrigerant branch part 241, the first expansion valve 240 may be disposed on one of the two branched refrigerant lines, and the second expansion valve 251 may be disposed on the other branched refrigerant line. In this case, the first expansion valve 240 may be disposed in front of the evaporator 242, and the second expansion valve 251 may be disposed in front of the chiller 252.

The evaporator 242 may be disposed at the rear of the first expansion valve 240 in the flow direction of the refrigerant and provided inside an air conditioning device 150 of a vehicle so that air moved by a blower 152 of the air conditioning device may be cooled through the evaporator 242 and supplied to the interior of a vehicle to be used for indoor cooling of the vehicle.

The refrigerant heat exchanger 233 serves to improve cooling performance by exchanging a refrigerant flowing into the evaporator 242 and a refrigerant discharged from the evaporator 242 with each other. Here, through the refrigerant heat exchanger 233, an inlet side refrigerant line, in which the refrigerant flows into the evaporator 242 connecting the refrigerant branch part 241 and the first expansion valve 240, passes and a discharge side refrigerant line in which the refrigerant is discharged from the evaporator 242 connecting the evaporator 242 and the refrigerant joining part 243, passes, and the refrigerants passing through the inlet side refrigerant line and the discharge side refrigerant line may exchange heat with each other at the refrigerant heat exchanger 233. Accordingly, the refrigerant may be further cooled by the refrigerant heat exchanger 233, before flowing into the first expansion valve 240, and the refrigerant discharged from the evaporator 242 may be further heated, so that cooling performance through the evaporator 242 may be improved and, at the same time, efficiency of the cooling system may be improved.

The chiller 252 may be disposed at the rear of the second expansion valve 251 in the flow direction of the refrigerant and heat-exchanged with a coolant to cool or heat the coolant. Accordingly, the first expansion valve 240 and the evaporator 242 form a set, and the second expansion valve 251 and the chiller 252 form another set, and the two sets are formed in parallel on the refrigerant line. In addition, a refrigerant line may join at a rear side of the evaporator 242 and the chiller 252 in the refrigerant flow direction to form one refrigerant line.

The heating line 301 may include the water-cooled condenser 220, a first coolant pump 450, a coolant heater 430, a heater core 440, and a first directional valve 410.

The water-cooled condenser 220 may allow the refrigerant and the coolant to heat exchange with each other, while passing therethrough, as described above.

The first coolant pump 450 is a means for pumping a coolant so that the coolant is circulated along the heating line 301. The first coolant pump 450 may be disposed at the rear of the water-cooled condenser 220 in the flow direction of the coolant and installed on the coolant line.

The coolant heater 430 is a device that heats the coolant, and may be connected to the rear of the first coolant pump 450 and to the front of the heater core 440 in the flow direction of the coolant. In addition, the coolant heater 430 may be operated when a temperature of the coolant is equal to or lower than a specific temperature, and may be variously formed, such as an induction heater, a sheath heater, a PTC heater, and a film heater that may generate heat using power.

The heater core 440 may be disposed in the air conditioning device 150 of the vehicle, and air blown by the blower 152 may be heated through the heater core 440, supplied to the interior of the vehicle and used for indoor heating. In addition, the heater core 440 may be disposed at the rear of and connected to the coolant heater 430 in the flow direction of the coolant.

The first directional valve 410 may be installed between the heater core 440 and the water-cooled condenser 220, and may be configured to selectively connect the heating line 301 and the cooling line 302 to be described later or may cut off connection. In more detail, the first directional valve 410 may be installed on the heating line 301 so that two coolant line pipes may be connected to the first directional valve 410, one first connection line 302-1 branched from one side of the coolant line 302 may be connected to the first directional valve 410, and one second connection line 302-2 branched from the other side of the cooling line 302 may be connected to the first directional valve 410. That is, four coolant lines are connected to meet at the first directional valve 410, and the first directional valve 410 may be a four-way directional valve for controlling a state in which the four coolant lines are connected or blocked.

The cooling line 302 may include an electric radiator 310, a reservoir tank 370, a second directional valve 320, a second coolant pump 420, a first directional valve 410, an electric component 460, a first coolant joint 313, a second coolant joint 312, a third coolant pump 340, a battery 350, a chiller 252, and a third directional valve 330.

The electric radiator 310 may be a radiator that cools the coolant heat-exchanged with the electric component 460 or the battery 350, and the electric radiator 310 may be cooled by air cooling by a cooling fan 311.

The reservoir tank 370 may serve to store a coolant and supplement coolant if there is insufficient coolant on the coolant line. The reservoir tank 370 may be installed on the coolant line at the rear of the electric radiator 310 in the flow direction of the coolant.

The second directional valve 320 may be installed on the cooling line 302 so that two coolant pipes may be connected to the second directional valve 320, and the first directional valve 410 and the second directional valve 320 may be connected to the first connection line 302-1 so that the heating line 301 and the cooling line 302 are connected. That is, the second directional valve 320 is connected to meet the three coolant lines, and the second directional valve 320 may be a 3-way directional valve to control a state in which the three coolant lines are connected to each other or cut off in connection.

The second coolant pump 420 is a means for pumping the coolant so that the coolant is circulated along the cooling line 302. The second coolant pump 420 may be installed on the first connection line 302-1 between the first directional valve 410 and the second directional valve 320 so that a coolant may flow from the second directional valve 320 to the first directional valve 410 by the operation of the second coolant pump 420.

The first directional valve 410 is the same as described in the heating line 301.

The electric component 460 is disposed on the second connection line 302-2 connecting the first directional valve 410 and the second coolant joint 312, so that the electric component 460 may be cooled by the coolant. In addition, the electric component 460 may be a driving motor, an inverter, an on board charger (OBC), etc.

The third coolant pump 340 is a means for pumping the coolant so that the coolant is circulated along the cooling line 302. In addition, the third coolant pump 420 may be installed at a coolant line between the first coolant joint 313 and the battery 350, so that a coolant may flow from the third coolant pump 420 to the battery 350.

The battery 350 is a power source of the vehicle, and may be a driving source of various electric components 460 in the vehicle. Alternatively, the battery 350 may be connected to a fuel cell to serve to store electricity or to store electricity supplied from the outside. In addition, the battery 350 may be disposed on the coolant line between the third coolant pump 420 and the third directional valve 330. Thus, the battery 350 may be heat-exchanged with the flowing coolant so as to be cooled or heated.

The first coolant joint 313 is installed on the coolant line at the rear of the second directional valve 320 in the flow direction of the coolant, and the first coolant joint 313 is connected to meet the three coolant lines. That is, the first coolant joint 313 is installed so that both sides are connected on the cooling line 302, and the third connection line 302-3 may be connected to a lower side. Here, the third connection line 302-3 may be connected to pass through the chiller 252.

The second coolant joint 312 may be installed at a point where a rear end of the second connection line 302-2 meets the cooling line 302, and connected so that three coolant lines meet at the second coolant joint 312. That is, the second coolant joint 312 is installed so that both sides are connected on the cooling line 302, and the second connection line 302-2 may be connected to an upper side.

The chiller 252 is the same as described above in the heating line 301 described above.

The third directional valve 330 is installed on the coolant line between the battery 350 and the second coolant joint 312, and two coolant pipes may be connected to the third directional valve 330 and the third connection line 302-3 may be connected to an upper side of the third directional valve 330 so that the battery 350 and the third connection line 302-3 may be connected in parallel. Here, the second directional valve 320 may be a three-way directional valve capable of controlling a state in which three coolant lines are connected to each other or cut off.

The air-conditioning device 150 may include a blower 152 installed on one side to blow air, and a temperature control door 151 may be installed inside the air-conditioning device 150. In addition, the evaporator 242 and the heater core 440 disposed in the air-conditioning device may be disposed and configured to allow air discharged from the blower 152 to flow into the indoor area after passing through only the evaporator 242 or to flow into the indoor area through the heater core 440 after passing through the evaporator 242 according to an operation of the temperature control door 151.

Hereinafter, an operation of the heat management system according to an exemplary embodiment of the present invention described above based on an operation mode will be described.

1. In Maximum Cooling Mode

Referring to FIG. 1, in the refrigerant circulation line 200, the compressor 210 operates so that a high temperature and high pressure refrigerant is discharged from the compressor 210. In addition, the refrigerant discharged from the compressor 210 is heat-exchanged with a coolant at the water-cooled condenser 220 so as to be cooled. Subsequently, when the refrigerant cooled and condensed at the water-cooled condenser 220 passes through the gas-liquid separator 235, a gaseous refrigerant and a liquid refrigerant are separated and only the liquid refrigerant is discharged. The discharged liquid refrigerant flows into the air-cooled condenser 230 and the refrigerant is heat-exchanged with external air at the air-cooled condenser 230 so as to be cooled. That is, both the water-cooled condenser 220 and the air-cooled condenser 230 serve as a condenser, and the water-cooled condenser 220 condenses the refrigerant, and the air-cooled condenser 230 subcools the refrigerant. The condensed refrigerant is then branched from the refrigerant branch part 241, and part of the refrigerant passes through the refrigerant heat exchanger 233 and then is throttled, while passing through the first expansion valve 240, so as to be expanded, and thereafter, the expanded refrigerant is heat-exchanged with air blown by the blower 152 of the air-conditioning device 150, while passing through the evaporator 242, so that air is cooled as the refrigerant is evaporated and the cooled air is supplied to the indoor area of the vehicle to perform indoor cooling. Also, the refrigerant evaporated at the evaporator 242 is heat-exchanged with the refrigerant before being introduced into the first expansion valve 240, while passing through the refrigerant heat-exchanger 233, and then flows into the compressor 210 again through the refrigerant joining part 243. Also, the remaining refrigerant branched from the refrigerant branch part 241 is throttled, while passing through the second expansion valve 251, so as to be expanded, and thereafter, the expanded refrigerant is heat-exchanged with a coolant, while passing through the chiller 252, so that the coolant may be cooled as the refrigerant is evaporated. Also, the refrigerant evaporated at the chiller 252 may flow into the compressor 210 again through the refrigerant joining part 243. The refrigerant passing through the evaporator 242 and the refrigerant passing through the chiller 252 joint at the refrigerant joining part 243 and flow into the compressor 210, and thereafter, the refrigerant is circulated, while repeating the process described above.

Meanwhile, the coolant of the coolant circulation line 200 is circulated by the operation of the first coolant pump 450, the second coolant pump 420, and the third coolant pump 340. In addition, the refrigerant passing through the water-cooled condenser 220, the electric component 460, and the battery 350 may be cooled by the coolant, and a heated coolant may be heat-exchanged with external air by the operation of the cooling fan 311 at the electric radiator 310 so as to be cooled. In this case, the first directional valve 410 and the second directional valve 320 may be adjusted in a direction connecting the heating line 301 and the cooling line 302. In more detail, in the first directional valve 410, an upper side and a left side may be connected to each other to allow the coolant to flow, and a lower side and a right side may be connected to each other to allow the coolant to flow. In addition, in the second directional valve 320, a left side and a lower side may be connected to each other to allow the coolant to flow and a right side may be blocked. In addition, in the third directional valve 330, an upper side and a right side may be connected to each other and a left side may be blocked.

Thus, the coolant flows into the electric radiator 310 again sequentially through the reservoir tank 370, the second directional valve 320, the second coolant pump 420, the first directional valve 410, the water-cooled condenser 220, the first coolant pump 450, the coolant heater 430, the heater core 440, the first directional valve 410, the electric component 460, and the second coolant joint 312 from the electric radiator 310, and this circulation cycle is repeated. Here, the coolant may not flow from the second directional valve 320 to the first coolant joint 313 by the second directional valve 320, and the coolant may not flow from the third directional valve 330 to the second coolant joint 312 by the third directional valve 330. Also, the coolant may flow into the chiller again sequentially through the first coolant joint 313, the third coolant pump 340, the battery 350, and the third directional valve 330 from the chiller 252, and the circulation cycle is repeated. That is, the battery 350 and the chiller 252 form a cooling line with a separate closed loop through which coolant is circulated by the second directional valve 320 and the third directional valve 330, so that the battery 350 may be cooled separately.

Here, the maximum cooling mode may be operated when a temperature of the outside air is in the range of 30☐ to 45☐, and at this time, the compressor 210 may be rotated at a maximum revolution per minute (RPM). Also, when cooling of the battery 350 is not required, the second expansion valve 251 may be closed so that a refrigerant may not flow toward the chiller 252, and at this time, the third coolant pump 340 may not be operated.

2. In Mild Cooling Mode

Figure 2:
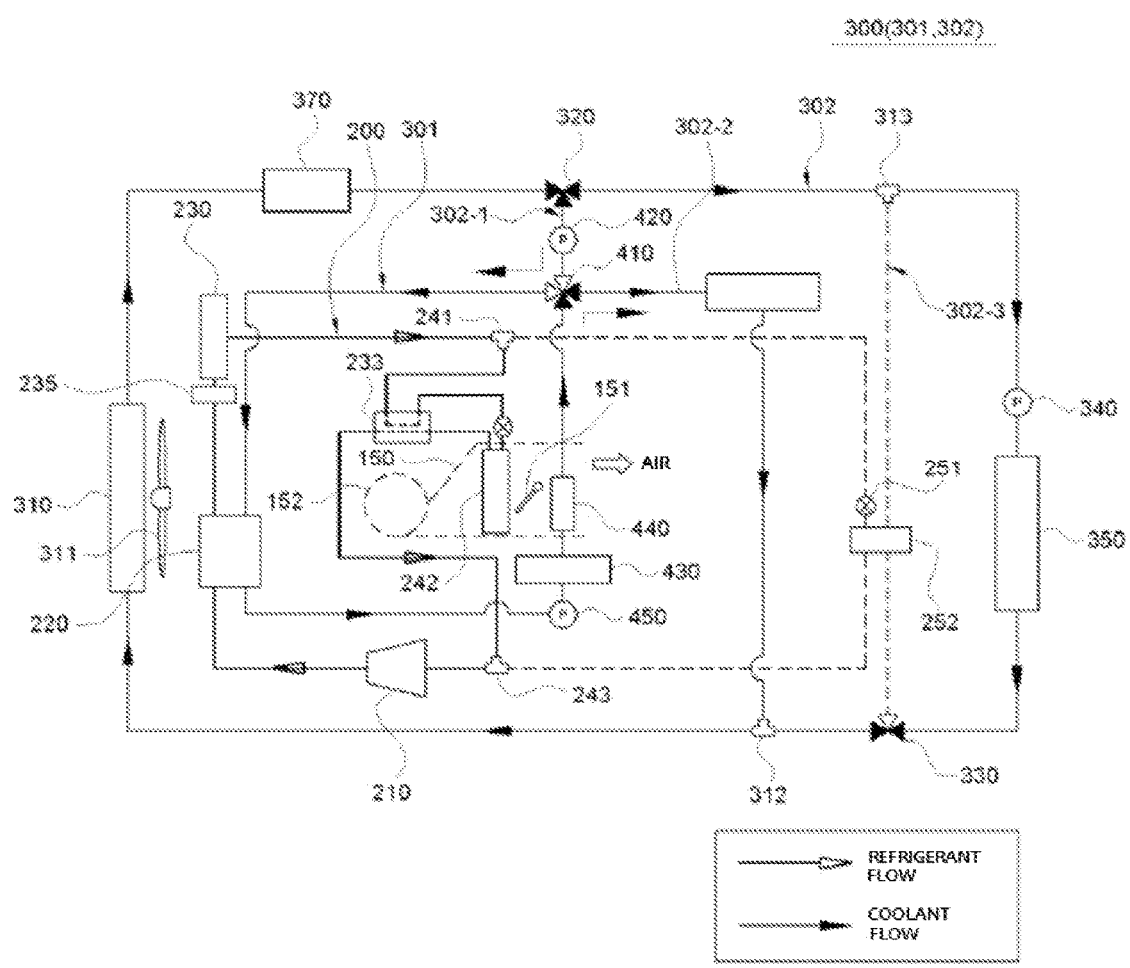
FIG. 2 is a block diagram showing an operating state in a mild cooling mode of a heat management system according to an exemplary embodiment of the present invention.

FIG. 2 is a configuration diagram showing an operating state in a mild cooling mode of a heat management system according to an exemplary embodiment of the present invention.

Referring to FIG. 2, in the refrigerant circulation line 200, the compressor 210 operates so that a high temperature and high pressure refrigerant is discharged from the compressor 210. In addition, the refrigerant discharged from the compressor 210 is heat-exchanged with a coolant at the water-cooled condenser 220 so as to be cooled. Subsequently, the refrigerant cooled in the water-cooled condenser 220 flows into the air-cooled condenser 230 through the gas-liquid separator 235, and the refrigerant is heat-exchanged with external air in the air-cooled condenser 230 so as to be cooled. The condensed refrigerant passes through the refrigerant branch part 241 and the refrigerant heat exchanger 233 and then is throttled, while passing through the first expansion valve 240, so as to be expanded, and thereafter, the expanded refrigerant is heat-exchanged with air blown by the blower 152 of the air-conditioning device 150, while passing through the evaporator 242, so that air is cooled as the refrigerant is evaporated and the cooled air is supplied to the indoor area of the vehicle to perform indoor cooling. Also, the refrigerant evaporated at the evaporator 242 is heat-exchanged with the refrigerant before being introduced into the first expansion valve, while passing through the refrigerant heat-exchanger 233, and then flows into the compressor 210 again through the refrigerant joining part 243. At this time, the second expansion valve 251 is blocked so that the refrigerant does not flow to the chiller 252. Thus, after the refrigerant passing through the evaporator 242 flows into the compressor 210, the refrigerant is circulated, while repeating the above-described process.

Meanwhile, the coolant of the coolant circulation line 200 is circulated by the operation of the first coolant pump 450, the second coolant pump 420, and the third coolant pump 340. In addition, the refrigerant passing through the water-cooled condenser 220, the electric component 460, and the battery 350 may be cooled by the coolant, and a heated coolant may be heat-exchanged with external air by the operation of the cooling fan 311 at the electric radiator 310 so as to be cooled. In this case, the first directional valve 410 and the second directional valve 320 may be adjusted in a direction connecting the heating line 301 and the cooling line 302. In more detail, in the first directional valve 410, an upper side and a left side may be connected to each other to allow the coolant to flow, and a lower side and a right side may be connected to each other to allow the coolant to flow. In addition, the left side, the lower side, and the right side, which are in three directions, may be connected at the second directional valve 320, so that the coolant may flow. In addition, the left side and the right side may be connected at the third directional valve 330, and the upper side may be blocked.

Thus, the coolant flows into the electric radiator 310 again sequentially through the reservoir tank 370, the second directional valve 320, the second coolant pump 420, the first directional valve 410, the water-cooled condenser 220, the first coolant pump 450, the coolant heater 430, the heater core 440, the first directional valve 410, the electric component 460, and the second coolant joint 312 from the electric radiator 310, and this circulation cycle is repeated. Here, part of the coolant flows to the right by the second directional valve 320 so as to flow sequentially through the first coolant joint 313, the third coolant pump 340, the battery 350, the third directional valve 330, and the second coolant joint 312, and then flows back to the electric radiator 310, and this circulation cycle is repeated. In this case, the coolant that has passed through the electric component 460 and the coolant that has passed through the battery 350 may join at the second coolant joint 312 and flow into the electric radiator 310.

Here, the mild cooling mode may be operated when a temperature of the outside air is in the range of 15☐ to 25☐, and here, the battery may be cooled by the electric radiator so that the refrigerant is not circulated through the chiller. Therefore, there is an advantage of reducing power consumed for driving the compressor. In addition, since a warm coolant flows through the heater core, it is possible to control to a slightly warm temperature only by adjusting the temperature control door 151 in the air-conditioning device 150 when a set temperature rises.

3. In Maximum Heating Mode

Figure 3:
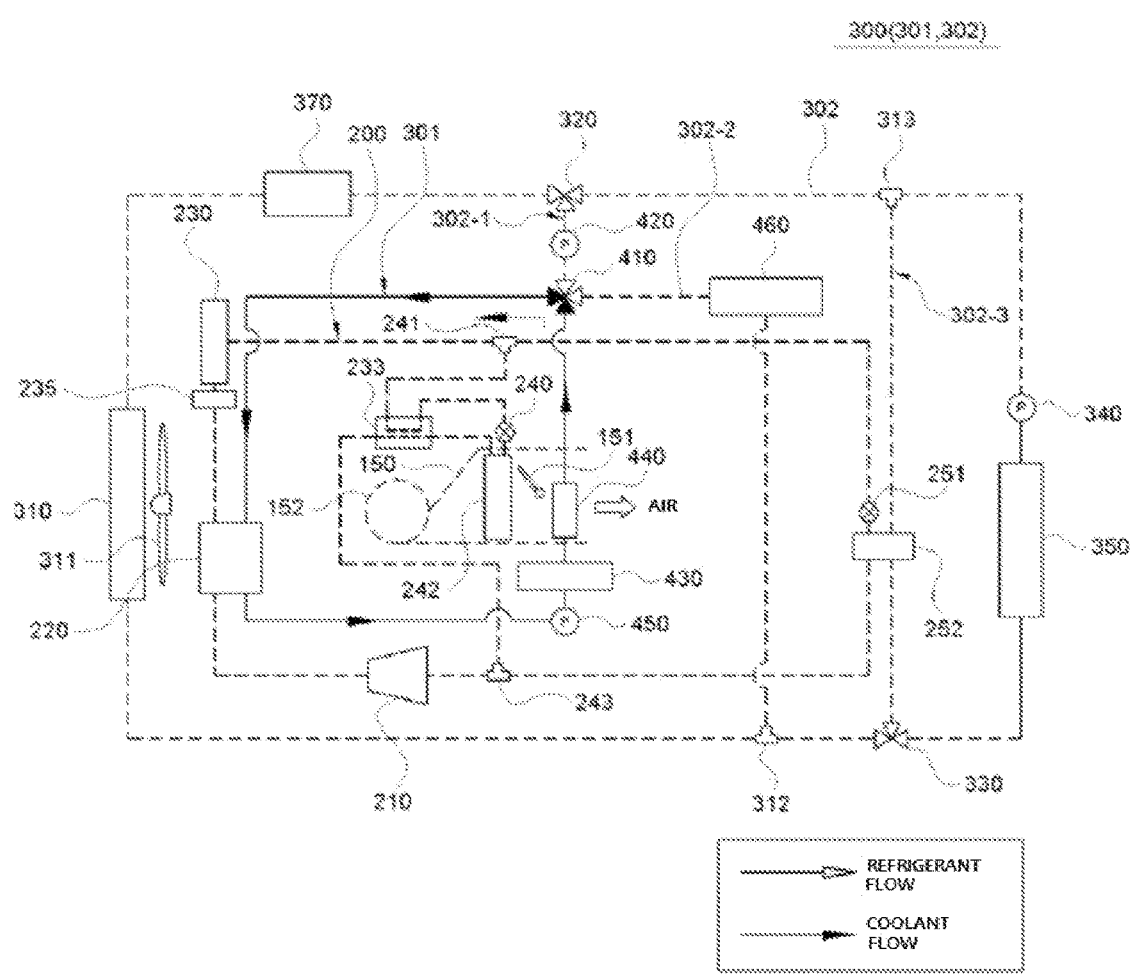
FIG. 3 is a block diagram showing an operating state in a maximum heating mode of a heat management system according to an exemplary embodiment of the present invention.

FIG. 3 is a configuration diagram showing an operating state in a maximum heating mode of a heat management system according to an exemplary embodiment of the present invention.

Referring to FIG. 3, the refrigerant circulation line 200 does not operate and thus the refrigerant is not circulated.

Meanwhile, the coolant of the coolant circulation line 200 is circulated by the operation of the first coolant pump 450. Here, the cooling line 302 may not be operated so that the coolant is not circulated, and only the heating line 301 is operated to circulate the coolant, and the coolant may be heated by the coolant heater 430.

Here, the first directional valve 410 may be adjusted in a direction in which the heating line 301 and the cooling line 302 are blocked. In more detail, the left side and the lower side of the first directional valve 410 are connected to each other so that the coolant may be circulated only along the heating line 301. Accordingly, the coolant may flow back to the first coolant pump 450 sequentially through the first coolant pump 450, the coolant heater 430, the heater core 440, the first directional valve 410, and the water-cooled condenser 220, and this circulation cycle is repeated. While passing through the heater core 440, the coolant is heat-exchanged with air blown by the blower 152 of the air-conditioning device 150 to heat the air, and the heated air is supplied to the interior of the vehicle to perform indoor heating.

4. In Mild Heating Mode

Figure 4:
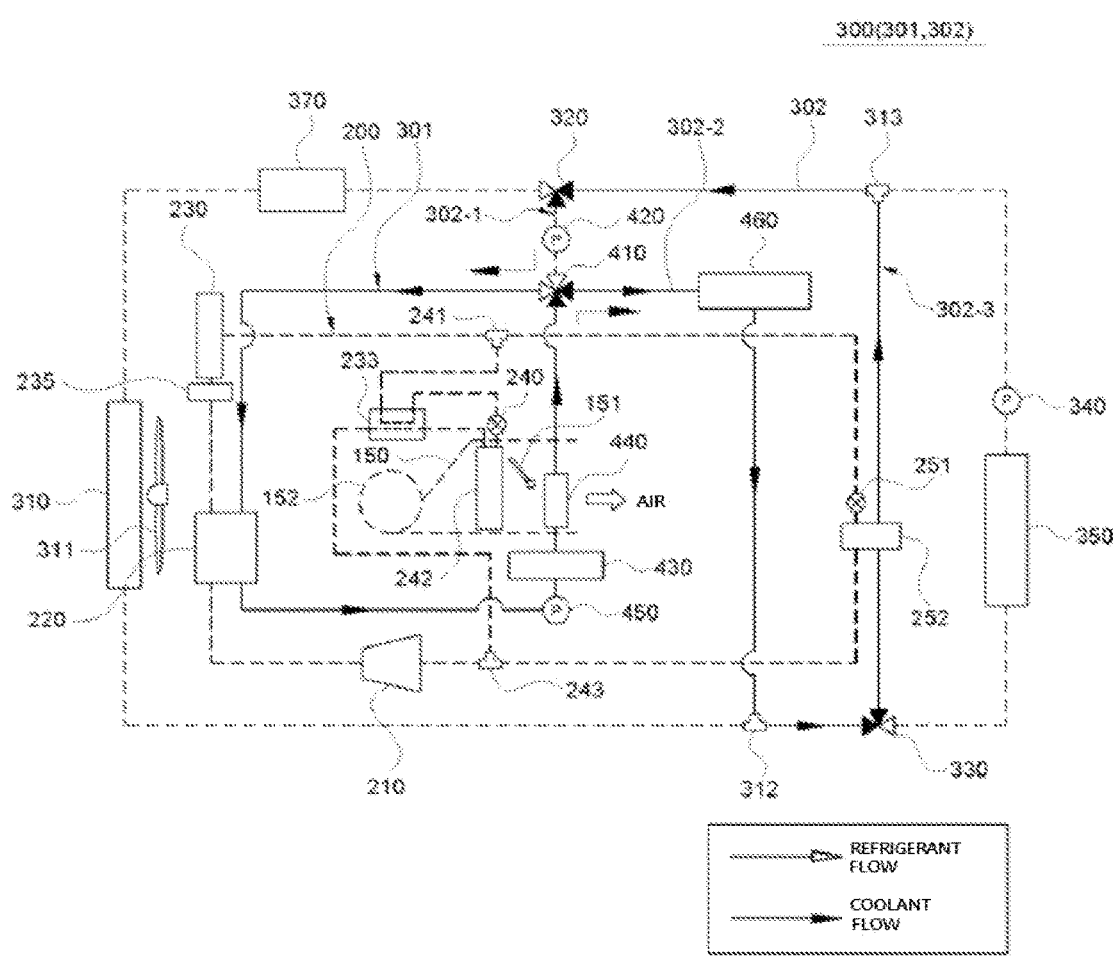
FIG. 4 is a configuration diagram showing an operating state in a mild heating mode of a heat management system according to an exemplary embodiment of the present invention.

FIG. 4 is a configuration diagram showing an operating state in a mild heating mode of a heat management system according to an exemplary embodiment of the present invention.

Referring to FIG. 4, the refrigerant circulation line 200 does not operate, so that the refrigerant is not circulated.

Meanwhile, the coolant of the coolant circulation line 200 is circulated by the operation of the first coolant pump 450 and the second coolant pump 420. In addition, the coolant may be heated by waste heat of the electric component 460, and if necessary, the coolant may be heated by operating the coolant heater 430. In this case, the first directional valve 410 and the second directional valve 320 may be adjusted in a direction connecting the heating line 301 and the cooling line 302. In more detail, in the first directional valve 410, an upper side and a left side may be connected to each other to allow the coolant to flow, and a lower side and a right side may be connected to each other to allow the coolant to flow. In addition, in the second directional valve 320, the right side and the lower side may be connected to each other to allow the coolant to flow and the left side may be blocked. In addition, the left and upper sides of the third directional valve 330 may be connected to each other and the right side may be blocked.

Accordingly, the coolant flows back to the second coolant pump 420 sequentially through the first directional valve 410, the water-cooled condenser 220, the first coolant pump 450, the coolant heater 430, the heater core 440, the first directional valve 410, the electric component 460, the second coolant joint 312, the third directional valve 330, the chiller 252, the first coolant joint 313, and the second directional valve 320 from the second coolant pump 420 so as to be circulated. This circulation cycle is repeated. Here, the coolant may not flow from the third directional valve 312 to the battery 350, the third coolant pump 340, and the first coolant joint 313 by the third directional valve 330, and the coolant may not flow from the second directional valve 320 to the second coolant joint 312 through the electric radiator 310 by the second directional valve 320. Thus, when demand for heating is low, the coolant may be heated using waste heat from the electric component 460 and used for indoor heating. In addition, since waste heat from the electric component is used, power consumption of the coolant heater may be reduced. In addition, if necessary, the coolant may be heated using waste heat from the battery 350 by adjusting the left, upper, and right sides of the third directional valve 330 to be connected, and operating the third coolant pump 340.

5. In Battery Temperature Rising Mode

Figure 5:
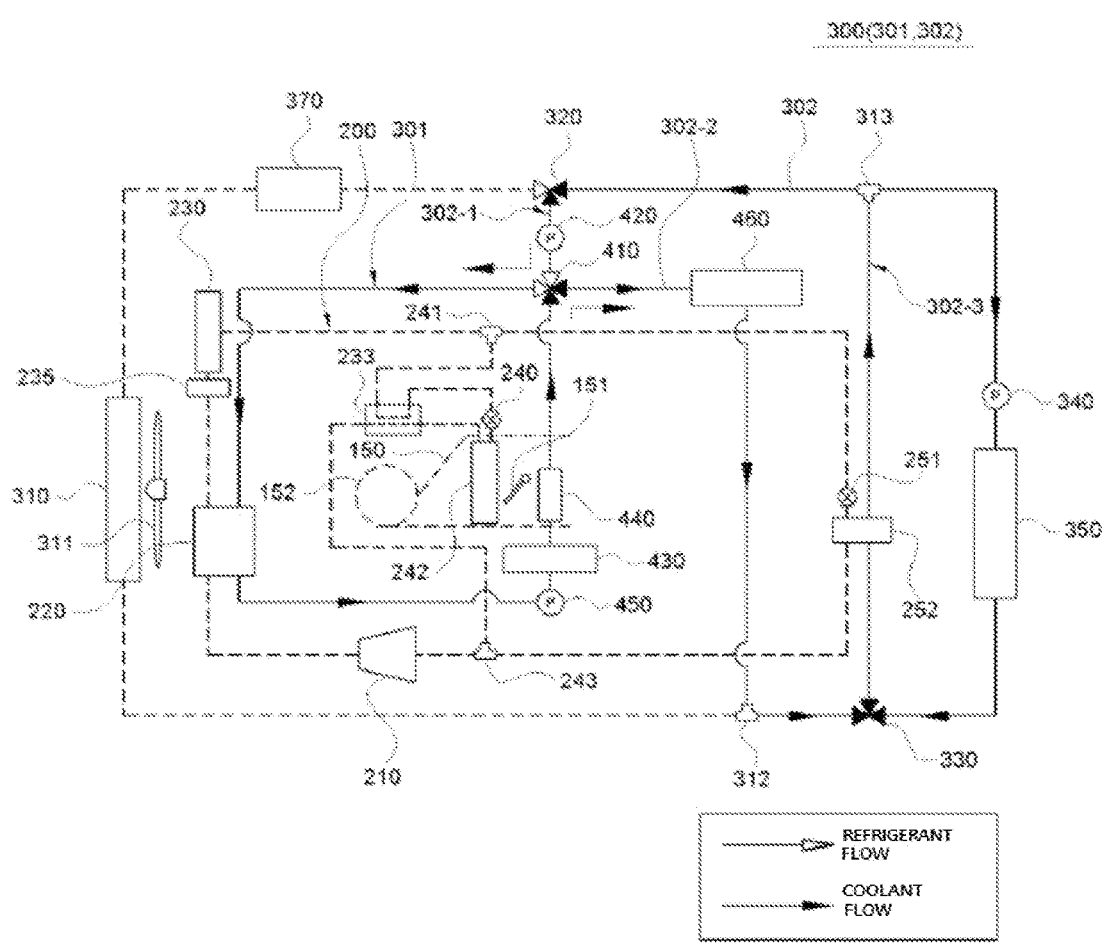
FIG. 5 is a configuration diagram showing an operating state in a battery temperature rising mode (or a battery heating mode) of a heat management system according to an exemplary embodiment of the present invention.

FIG. 5 is a configuration diagram showing an operating state in a battery temperature rising mode of a heat management system according to an exemplary embodiment of the present invention.

Referring to FIG. 5, the refrigerant circulation line 200 does not operate, so that the refrigerant is not circulated.

Meanwhile, the coolant of the coolant circulation line 200 is circulated by the operation of the first coolant pump 450, the second coolant pump 420, and the third coolant pump 340. In addition, the coolant may be heated by waste heat of the coolant heater 430 and the electric component 460. In this case, the first directional valve 410 and the second directional valve 320 may be adjusted in a direction connecting the heating line 301 and the cooling line 302. In more detail, in the first directional valve 410, the upper side and the left side may be connected to each other to circulate the coolant, and the lower side and the right side may be connected to each other to circulate the coolant. In addition, in the second directional valve 320, the right side and the lower side may be connected to circulate the coolant, and the left side may be blocked. In addition, in the third directional valve 330, all the left side, the upper side, and the right side may be connected to each other.

Accordingly, the coolant may flow back to the second coolant pump 420 sequentially through the first directional valve 410, the water-cooled condenser 220, the first coolant pump 450, the coolant heater 430, the heater core 440, the first directional valve 410, the electric component 460, the second coolant joint 312, the third directional valve 330, the chiller 252, the first coolant joint 313, and the second directional valve 320 from the second coolant pump 420 so as to be circulated. This circulation cycle is repeated. Here, the coolant passing through the battery 350 may join at the third directional valve 330, flow upward, and may then be branched to both sides at the first coolant joint 313. Here, the coolant may not flow from the second directional valve 320 to the second coolant joint 312 through the electric radiator 310 by the second directional valve 320. Thus, the heated coolant may heat the battery 350, so that initial performance of the battery 350 may be quickly improved in the winter when an outside temperature is low.

6. In Dehumidification Heating Mode

Figure 6:
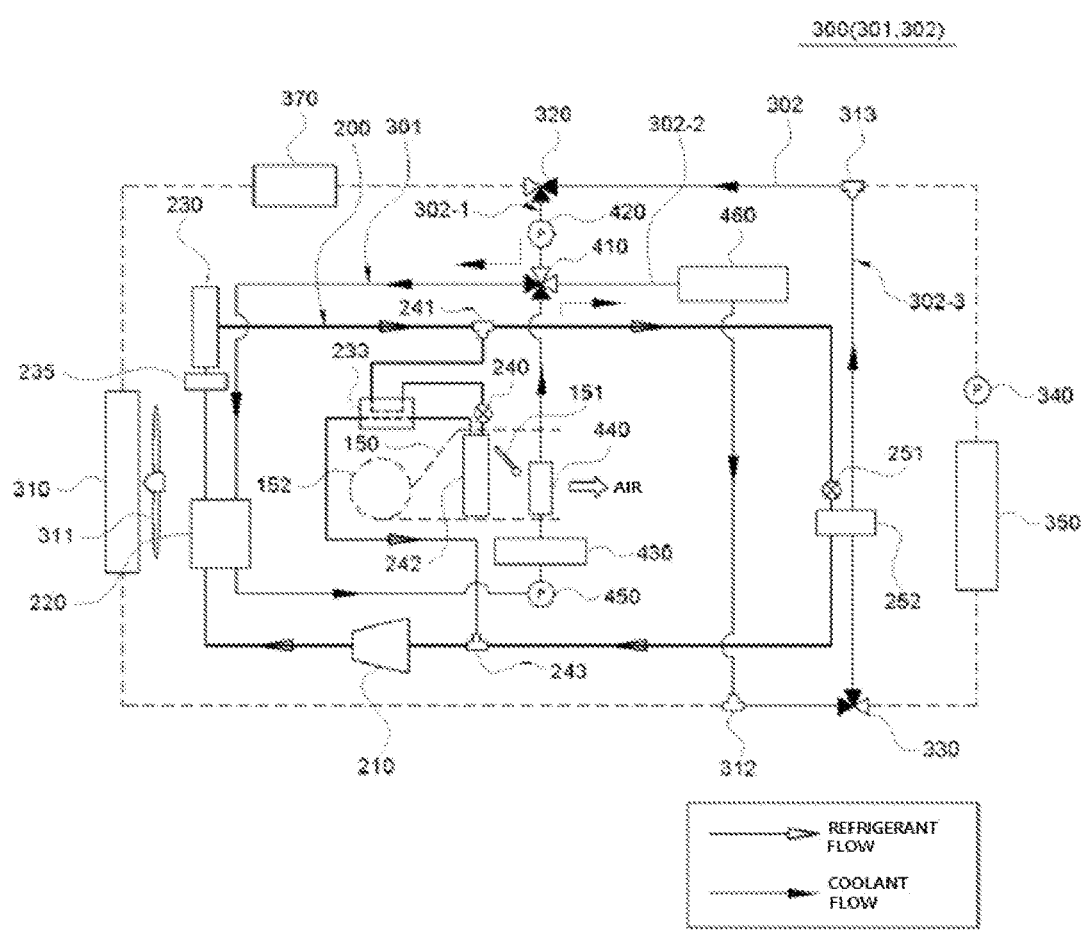
FIG. 6 is a block diagram showing an operating state in a dehumidification heating mode of a heat management system according to an exemplary embodiment of the present invention.

FIG. 6 is a block diagram showing an operating state in a dehumidification heating mode of a heat management system according to an exemplary embodiment of the present invention.

Referring to FIG. 6, in the refrigerant circulation line 200, the compressor 210 operates so that a high temperature and high pressure refrigerant is discharged from the compressor 210. In addition, the refrigerant discharged from the compressor 210 is heat-exchanged with a coolant at the water-cooled condenser 220 so as to be cooled. Subsequently, when the refrigerant that is cooled and condensed at the water-cooled condenser 220 passes through the gas-liquid separator 235, a gaseous refrigerant and a liquid refrigerant are separated and only the liquid refrigerant is discharged. The discharged liquid refrigerant flows into the air-cooled condenser 230 and the refrigerant is heat-exchanged with external air at the air-cooled condenser 230 so as to be cooled. That is, both the water-cooled condenser 220 and the air-cooled condenser 230 serve as a condenser, and the water-cooled condenser 220 condenses the refrigerant, and the air-cooled condenser 230 subcools the refrigerant. The condensed refrigerant is then branched from the refrigerant branch part 241, and part of the refrigerant passes through the refrigerant heat exchanger 233 and then is throttled, while passing through the first expansion valve 240, so as to be expanded, and thereafter, the expanded refrigerant is heat-exchanged with air blown by the blower 152 of the air-conditioning device 150, while passing through the evaporator 242, so that air is cooled as the refrigerant is evaporated and the cooled air is supplied to the indoor area of the vehicle to perform indoor cooling. Also, the refrigerant evaporated at the evaporator 242 is heat-exchanged with the refrigerant before being introduced into the first expansion valve 240, while passing through the refrigerant heat-exchanger 233, and then flows into the compressor 210 again through the refrigerant joining part 243. Also, the remaining refrigerant branched from the refrigerant branch part 241 is throttled, while passing through the second expansion valve 251, so as to be expanded, and thereafter, the expanded refrigerant is heat-exchanged with a coolant, while passing through the chiller 252, so that the coolant may be cooled as the refrigerant is evaporated. Also, the refrigerant evaporated at the chiller 252 may flow into the compressor 210 again through the refrigerant joining part 243. The refrigerant passing through the evaporator 242 and the refrigerant passing through the chiller 252 joint at the refrigerant joining part 243 and flow into the compressor 210, and thereafter, the refrigerant is circulated, while repeating the process described above.

Meanwhile, the coolant of the coolant circulation line 200 is circulated by the operation of the first coolant pump 450 and the second coolant pump 420. In addition, the coolant may be heated by heat of the water-cooled condenser 220 and the electric component and may be heated by heat of the coolant heater 430. In this case, the first directional valve 410 and the second directional valve 320 may be adjusted in a direction connecting the heating line 301 and the cooling line 302. In more detail, in the first directional valve 410, an upper side and a left side may be connected to each other to allow the coolant to flow, and a lower side and a right side may be connected to each other to allow the coolant to flow. In addition, in the second directional valve 320, the right side and the lower side may be connected to each other to allow the coolant to flow and the left side may be blocked. In addition, in the third directional valve 330, the left side and the upper side may be connected to each other and the right side may be blocked.

Accordingly, the coolant flows back to the second coolant pump 420 sequentially through the first directional valve 410, the water-cooled condenser 220, the first coolant pump 450, the coolant heater 430, the heater core 440, the first directional valve 410, the electric component 460, the second coolant joint 312, the third directional valve 330, the chiller 252, the first coolant joint 313, and the second directional valve 320 from the second coolant pump 420, so as to be circulated. This circulation cycle is repeated. Here, the coolant may not flow from the third directional valve 312 to the battery 350, the third coolant pump 340, and the first coolant joint 313 by the third directional valve 330, and the coolant may not flow from the second directional valve 320 to the second coolant joint 312 through the electric radiator 310 by the second directional valve 320. Here, the coolant heater 430 may be operated as needed, and air dehumidified, while passing through the evaporator 242, may be heated while passing through the heater core 440 to be used for indoor heating.

Figure 7:
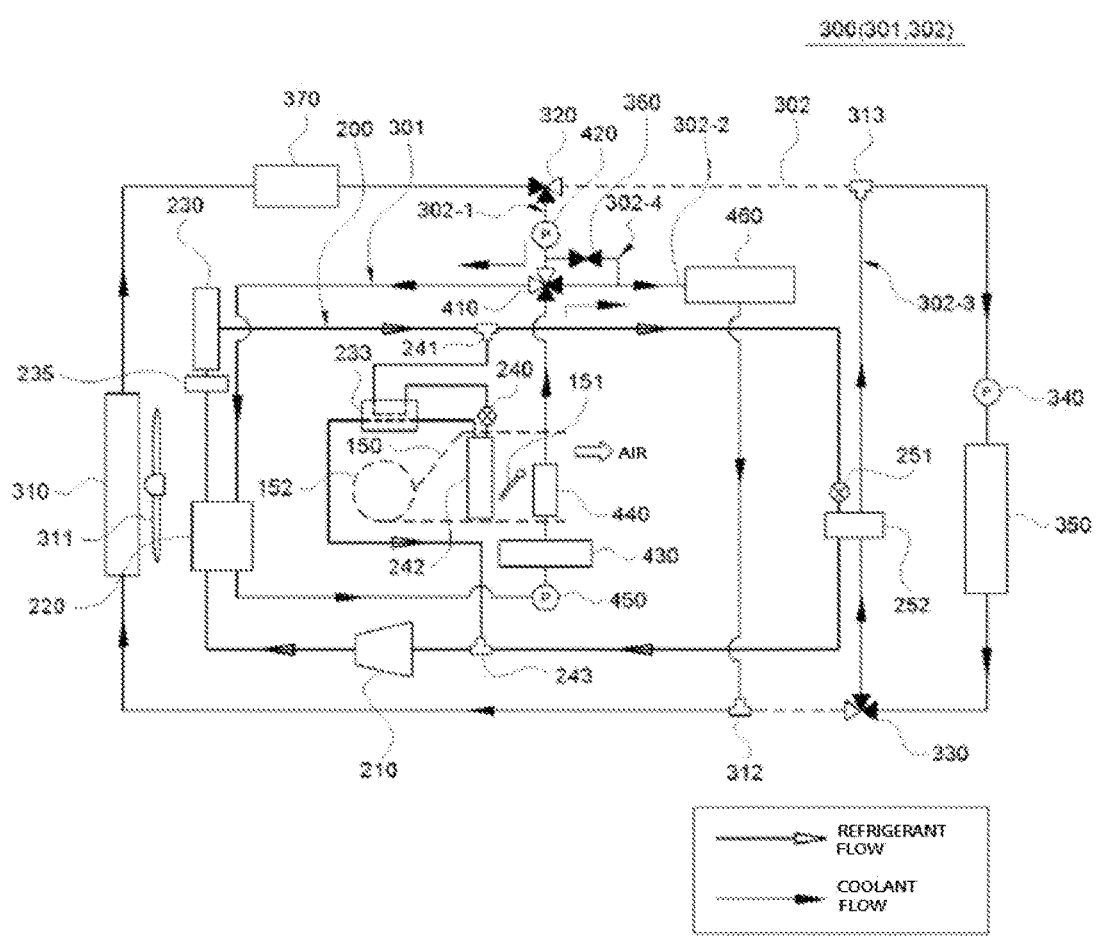
FIG. 7 is a block diagram showing a heat management system according to another exemplary embodiment of the present invention.
Figure 8:
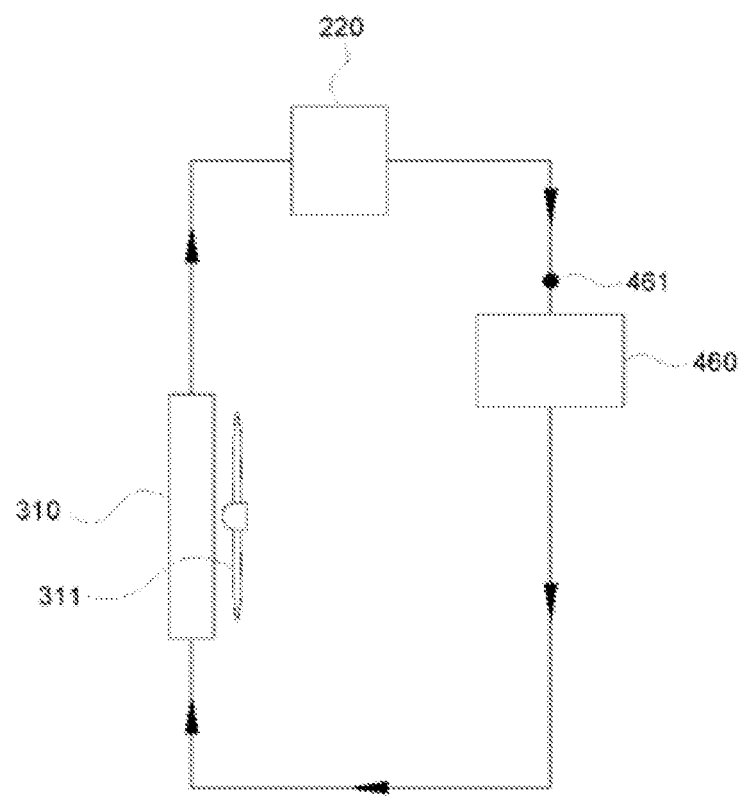
FIGS. 8 and 9 are conceptual diagrams showing a flow of a coolant in a coolant circulation line according to opening and closing of a shut-off valve in FIG. 7.
Figure 9:
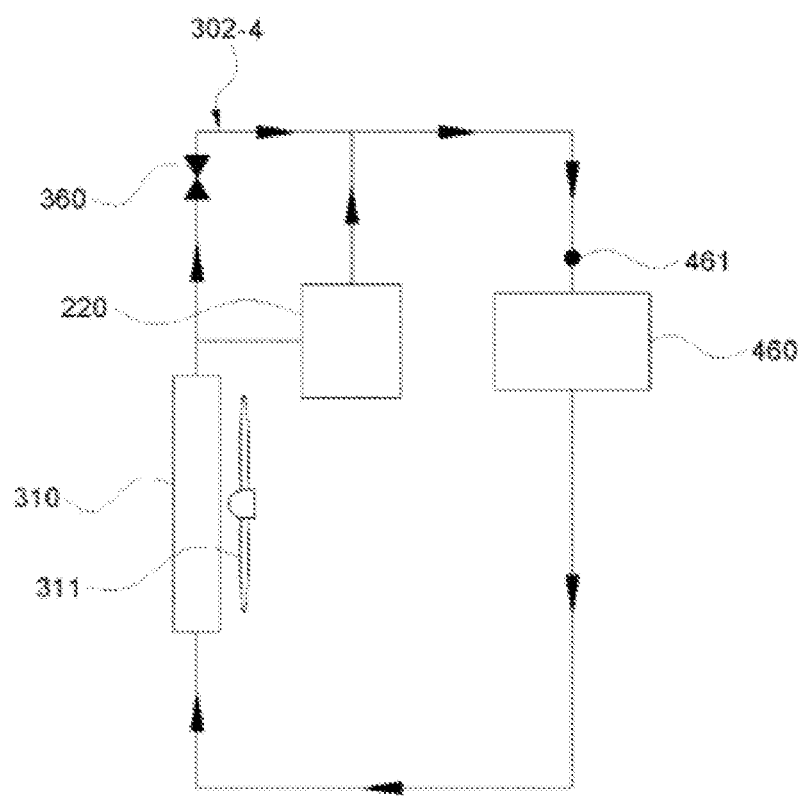

FIG. 7 is a block diagram showing a heat management system according to another exemplary embodiment of the present invention, and FIGS. 8 and 9 are conceptual diagrams showing a flow of a coolant in a coolant circulation line according to opening and closing of a shut-off valve in FIG. 7.

Referring to FIG. 7, the cooling line 302 may further include a fourth connection line 302-4 connecting the first connection line 302-1 and the second connection line 302-2. The shut-off valve 360 may be installed on the fourth connection line 302-4 so that the shut-off valve 360 may be disposed in parallel with the first directional valve 410.

Therefore, in a normal state, as shown in FIG. 8, the electric component 460 is cooled using a flow of the coolant in a state in which the shut-off valve 360 is closed, and when cooling demand of the electric component 460 is large, the electric component 460 may be cooled using a cooler coolant by opening the shut-off valve 360. Here, the coolant temperature sensor 461 may be installed close to the front of the electric component 460 in the flow direction of the coolant, and cooling of the electric component 460 may be adjusted by controlling opening and closing of the shut-off valve 360 according to temperatures of the coolant measured by the coolant temperature sensor 461.

In the refrigerant circulation line 200, the first expansion valve 240 and the second expansion valve 251 are both formed of electronic expansion valves, so that the valves may be slowly opened and closed, minutely controlled, and controlled in cooling performance. Also, the first expansion valve 240 may be formed of an electronic switching valve-attached mechanical heat sensing expansion valve (TXV W/S valve) which adjusts a flow of a refrigerant mechanically according to temperature of the refrigerant and integrally includes an electronically opened and closed valve, and the second expansion valve 251 may be formed of an electronic expansion valve EXV. Here, the use of the electronic switching valve-attached mechanical heat sensing expansion valve (TXV W/S valve) advantageously incurs low cost and does not require control of overheating of the refrigerant. Alternatively, both the first expansion valve 240 and the second expansion valve 251 may be formed of the electronic switching valve-attached mechanical heat sensing expansion valve (TXV W/S valve).

Figure 10:
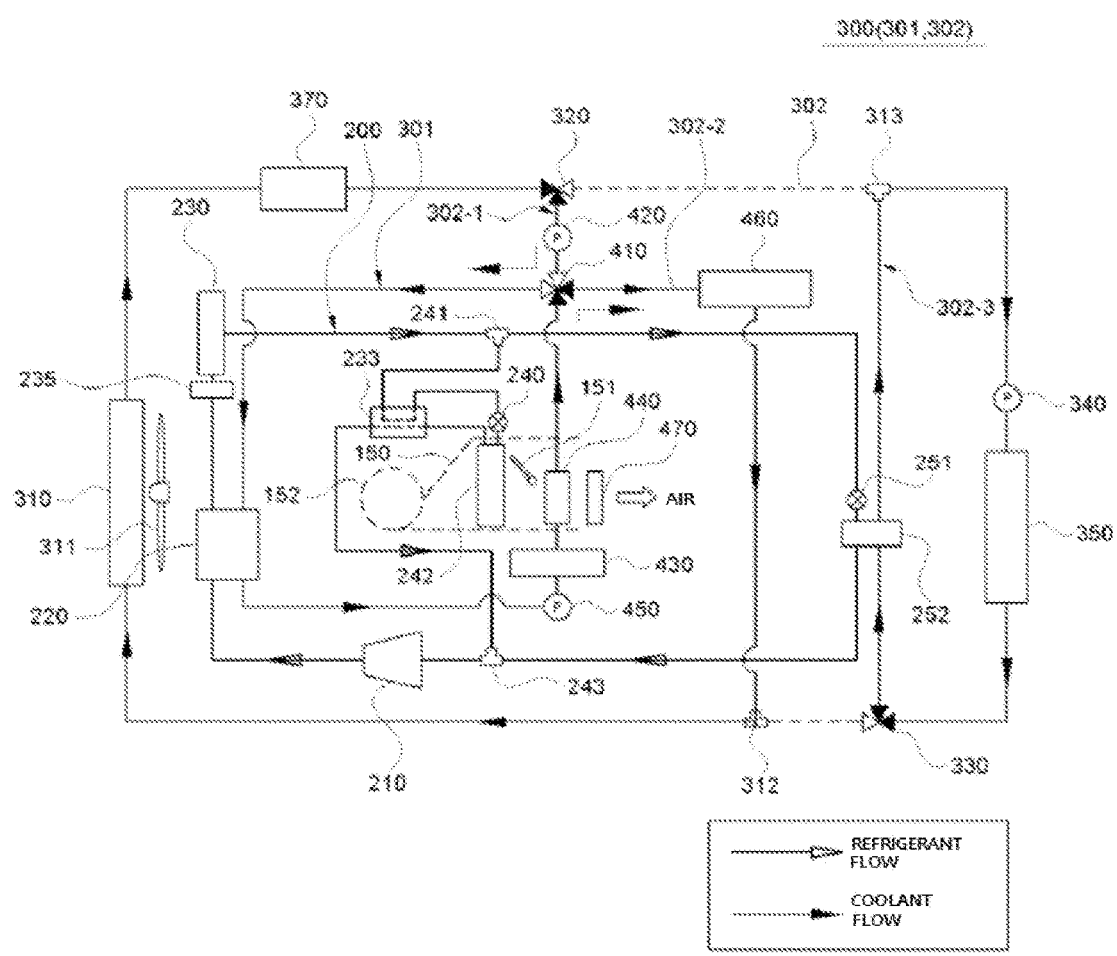
FIGS. 10 and 11 are configuration diagrams showing exemplary embodiments to which an air heating type heater according to the present invention is applied.
Figure 11:
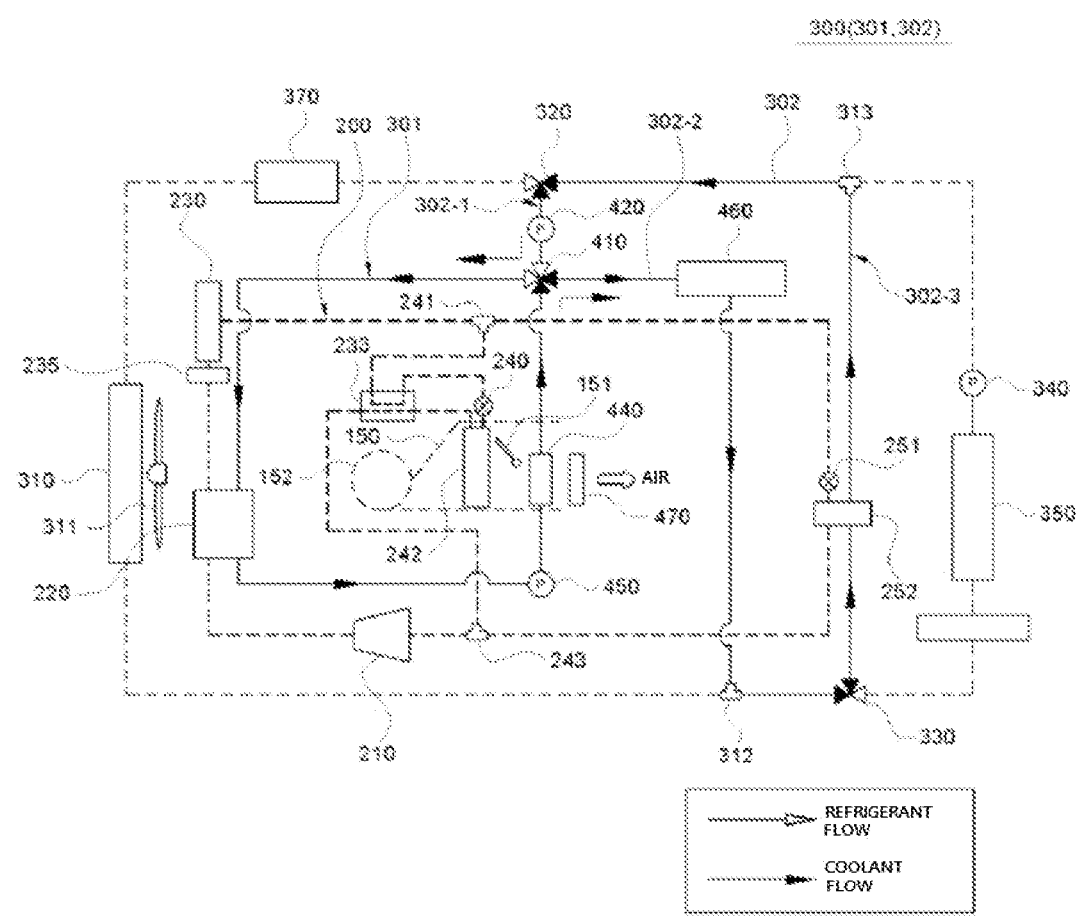

FIGS. 10 and 11 are configuration diagrams showing exemplary embodiments to which an air heating type heater according to the present invention is applied.

Referring to FIG. 10, the heat management system according to the present invention may further include an air heating type heater 470 configured apart from the heating line 301 and directly heating air flowing into the indoor area to heat the indoor area. That is, the air heating type heater 470 may be provided near the heater core 440, and the air heating type heater 470 may be formed of a PTC heater operated by electricity, for example, to rapidly heat air. Thus, it is possible to increase speed effectiveness of indoor heating. Here, since the coolant previously heated by the coolant heater 430 flows into the heater core 440, a low voltage PTC heater having a relatively small heat generation capacity may be used as the air heating type heater 470, and accordingly, the air heating type heater 470 may be configured at low cost, compared with a high voltage PTC heater.

Also, referring to FIG. 11, the air heating type heater 470 may be provided near the heater core 440, and the coolant heater 430 may be installed at the cooling line 302 near the battery 350 rather than the heating line 301. Accordingly, an air heating type heater may be used for heating and a coolant heater may be separately applied to heat the battery, thereby increasing efficiency and separately controlling the battery.

Figure 12:
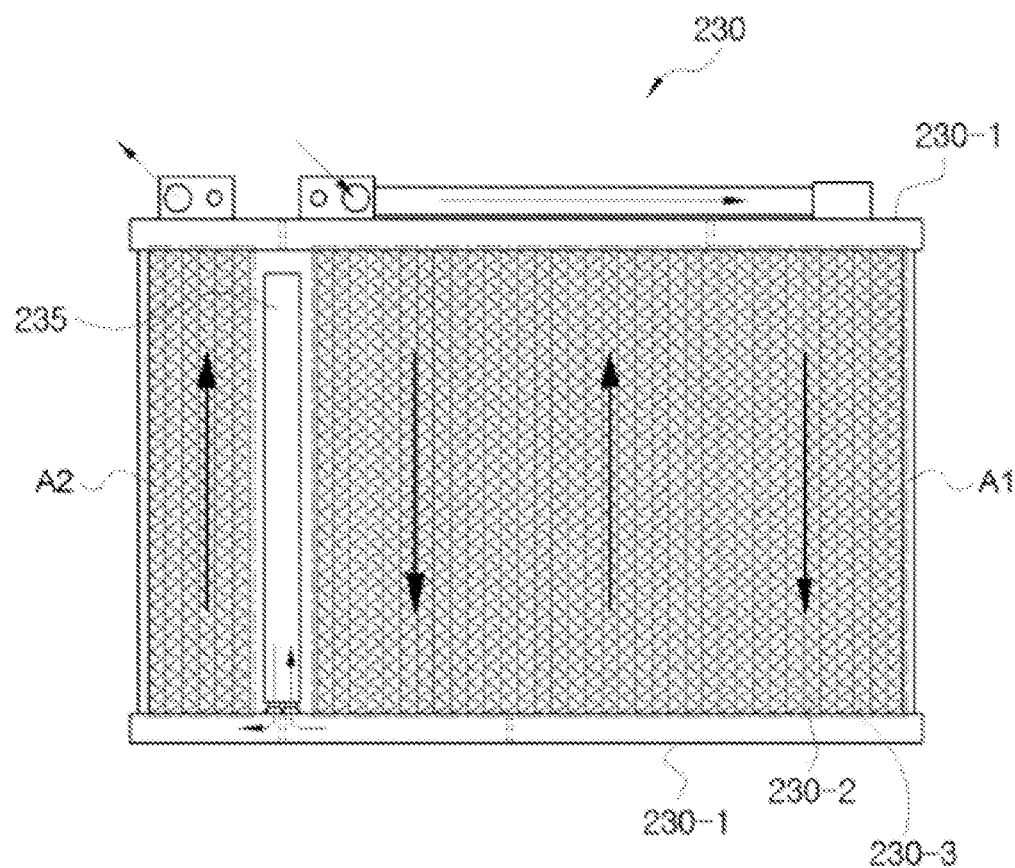
FIG. 12 is a front view showing an exemplary embodiment of an air-cooled condenser with a gas-liquid separator integrally formed inside thereof according to the present invention.

FIG. 12 is a front view showing an exemplary embodiment of an air-cooled condenser in which a gas-liquid separator according to the present invention is integrally formed therein.

Referring to FIG. 12, the gas-liquid separator 235 may be disposed between tubes 230-2 inside the air-cooled condenser 230, and a partial area (right side) of the air-cooled condenser 230 demarcated by the gas-liquid separator 235 may be used as a condensed area A1 and the other area (left side) may be used as a subcooled area A2. For example, as shown, in the air-cooled condenser 230, a pair of header tanks 230-1 may be disposed vertically, both ends of the tubes 230-2 are connected to the header tanks 230-1, and fins 230-3 may be interposed between the tubes 230-2. Also, the gas-liquid separator 235 may be disposed between the header tanks 230-1 in an up-down direction, the gas-liquid separator 235 may be disposed between the tubes 230-2 in a left-right direction, and the gas-liquid separator 235 may be directly connected and coupled to the header tank 230-1.

Alternatively, the gas-liquid separator 235 may be formed integrally and disposed close to the rear of the water-cooled condenser 220 in the flow direction of the refrigerant or disposed close to the front of the air-cooled condenser 230 and formed integrally. In addition, the water-cooled condenser, the air-cooled condenser, and the gas-liquid separator may be configured in various forms.

It will be obvious to those skilled in the art to which the present invention pertains that the present invention described above is not limited to the above-mentioned exemplary embodiments and the accompanying drawings, but may be variously substituted, modified, and altered without departing from the scope and spirit of the present invention.

DETAILED DESCRIPTION OF MAIN ELEMENTS

150: air-conditioning device, 151: temperature control door

152: blower
200: refrigerant circulation line, 210: compressor
220: water-cooled condenser, 230: air-cooled condenser
230-1: header tank, 230-2 tube
230-3: fin
A1: condensed area, A2: subcooled area
231: check valve
232: first refrigerant bypass line, 233: refrigerant heat exchanger
234: second refrigerant bypass line, 235: gas-liquid separator
240: first expansion valve
240-1: three-way directional valve, 240-2: first switching valve
240-3: second switching valve, 241: refrigerant branch part
242: evaporator, 243: refrigerant joining part
251: second expansion valve, 252: chiller
300: coolant circulation line, 301: heating line
302: cooling line, 302-1: first connection line
302-2: second connection line, 302-3: third connection line
302-4: fourth connection line
310: electric radiator, 311: cooling fan
312: second coolant joint, 313: first coolant joint
320: second directional valve, 330: third directional valve
340: third coolant pump, 350: battery
360: shut-off valve, 370: reservoir tank
410: first directional valve, 420: second coolant pump
430: coolant heater, 440: heater core
450: first coolant pump, 460: electric component
461: coolant temperature sensor, 470: air heating type heater

The invention claimed is:

1. A heat management system comprising:
a refrigerant circulation line comprising a compressor, a water-cooled condenser, a gas-liquid separator, an air-cooled condenser, a first expansion valve, an evaporator, and a refrigerant heat exchanger for heat-exchanging a refrigerant flowing into the evaporator and the refrigerant discharged from the evaporator with each other,
wherein the gas-liquid separator is installed in and connected to a refrigerant flow path from the water-cooled condenser to the air-cooled condenser, separates a gaseous refrigerant and a liquid refrigerant from an introduced refrigerant to discharge the liquid refrigerant, and circulates the refrigerant to cool an indoor area;
a heating line heating the indoor area by circulating a coolant heat-exchanged with the refrigerant through the water-cooled condenser; and
a cooling line cooling a battery and an electric component by circulating the coolant heat-exchanged with air or the refrigerant,
wherein the cooling line comprises a first connection line branched from one side of the cooling line and connected to the heating line; and a second connection line branched from the other side of the cooling line and connected to the heating line.

2. The heat management system of claim 1, wherein the first connection line, the second connection line, and the heating line are connected to a first directional valve, and the cooling line and the heating line are connected to each other or blocked in connection by the first directional valve.

3. The heat management system of claim 2, wherein the electric component is disposed on the second connection line.

4. The heat management system of claim 3, wherein the cooling line further comprises:
a fourth connection line connecting the first connection line and the second connection line; and
a shut-off valve installed on the fourth connection line and disposed in parallel with the first directional valve.

5. The heat management system of claim 4, wherein the cooling line further comprises a coolant temperature sensor installed in front of the electric component in a flow direction of coolant.

6. The heat management system of claim 1, wherein the refrigerant circulation line further comprises a second expansion valve throttling or bypassing the refrigerant discharged from the water-cooled condenser or blocking a flow of the refrigerant; and a chiller heat-exchanging the refrigerant discharged from the second expansion valve with the coolant of the cooling line.

7. The heat management system of claim 6, wherein the cooling line comprises a third connection line connected in parallel with the battery and passing through the chiller, and the third connection line is connected to the cooling line by a third directional valve so that the coolant flows in the third connection line or a flow of the coolant is blocked by the third directional valve.

8. The heat management system of claim 1, wherein the cooling line comprises an electric radiator for cooling the coolant with air.

9. The heat management system of claim 1, wherein the heating line comprises a heater core heating the indoor area using air heated by heat-exchanging a coolant heat-exchanged with the refrigerant through the water-cooled condenser and air introduced to the indoor area; and a coolant heater disposed in front of the heater core in a flow direction of the coolant to heat the coolant.

10. The heat management system of claim 9, further comprising:
an air heating type heater configured separately from the heating line and heating the indoor area by directly heating air introduced to the indoor area.

11. The heat management system of claim 10, wherein the heating line comprises the heater core heating the indoor area using heated air by heat-exchanging a coolant heat-exchanged with the refrigerant through the water-cooled condenser and air introduced to the indoor area, and
the heat management system further comprises:
the air heating type heater configured separately from the heating line and heating the indoor area by directly heating air introduced to the indoor area.

12. The heat management system of claim 11, wherein the cooling line further comprises a coolant heater disposed close to the battery to heat the coolant passing through the battery.

13. The heat management system of claim 10, wherein the gas-liquid separator is disposed close to the rear of the water-cooled condenser in a flow direction of the refrigerant so as to be formed integrally, or the gas-liquid separator is disposed close to the front of the air-cooled condenser so as to be formed integrally.

14. The heat management system of claim 13, wherein the gas-liquid separator is disposed inside the air-cooled condenser, and a partial area of the air-cooled condenser demarcated by the gas-liquid separator is used as a condensed area A1 and the other area may be used as a sub-cooled area A2.

15. The heat management system of claim 10, wherein, in a maximum heating mode, the refrigerant is not circulated in the refrigerant circulation line.

16. The heat management system of claim 15, wherein, in a mild cooling mode, the second expansion valve is closed so that the refrigerant does not pass through the chiller.

17. The heat management system of claim 10, wherein, in the maximum heating mode, the coolant is not circulated in the cooling line.

18. The heat management system of claim 10, wherein, in the mild heating mode, the refrigerant is not circulated in the refrigerant circulation line.

19. The heat management system of claim 10, wherein, in a battery temperature rising mode, the refrigerant is not circulated in the refrigerant circulation line.

20. A heat management system comprising:
 a refrigerant circulation line comprising a compressor, a water-cooled condenser, a gas-liquid separator, an air-cooled condenser, a first expansion valve, an evaporator, and a refrigerant heat exchanger for heat-exchanging a refrigerant flowing into the evaporator and the refrigerant discharged from the evaporator with each other,
 wherein the gas-liquid separator is installed in and connected to a refrigerant flow path from the water-cooled condenser to the air-cooled condenser, separates a gaseous refrigerant and a liquid refrigerant from an introduced refrigerant to discharge the liquid refrigerant, and circulates the refrigerant to cool an indoor area;
 a heating line heating the indoor area by circulating a coolant heat-exchanged with the refrigerant through the water-cooled condenser; and
 a cooling line cooling a battery and an electric component by circulating the coolant heat-exchanged with air or the refrigerant,
 wherein the heating line comprises a heater core heating the indoor area using air heated by heat-exchanging the coolant heat-exchanged with the refrigerant through the water-cooled condenser and air introduced to the indoor area; and a coolant heater disposed in front of the heater core in a flow direction of the coolant to heat the coolant.

\* \* \* \* \*